Oct. 15, 1968   R. M. BERGER ET AL   3,405,717
METHOD OF ASSOCIATING A FILTER SECTION WITH A TOBACCO
SECTION OR WITH ONE OR MORE ADDITIONAL
FILTER SECTIONS
Filed Nov. 15, 1966   4 Sheets-Sheet 1

INVENTORS
Richard M. Berger
Reavis C. Sproull
BY Jacobi and Davidson
ATTORNEYS

INVENTORS
Richard M. Berger
Reavis C. Sproull

BY Jacobs and Davidson

ATTORNEYS

Oct. 15, 1968  R. M. BERGER ET AL  3,405,717
METHOD OF ASSOCIATING A FILTER SECTION WITH A TOBACCO
SECTION OR WITH ONE OR MORE ADDITIONAL
FILTER SECTIONS
Filed Nov. 15, 1966  4 Sheets-Sheet 4

INVENTORS
Richard M. Berger
Reavis C. Sproull

Jacobi and Davidson
ATTORNEYS

United States Patent Office 3,405,717
Patented Oct. 15, 1968

3,405,717
METHOD OF ASSOCIATING A FILTER SECTION WITH A TOBACCO SECTION OR WITH ONE OR MORE ADDITIONAL FILTER SECTIONS
Richard M. Berger and Reavis C. Sproull, Richmond, Va., assignors to American Filtrona Corporation, Richmond, Va., a corporation of New York
Continuation-in-part of application Ser. No. 502,261, Oct. 22, 1965, now Patent No. 3,313,306. This application Nov. 15, 1966, Ser. No. 594,515
9 Claims. (Cl. 131—94)

This application is a continuation-in-part of copending application Ser. No. 502,261 filed Oct. 22, 1965, now Patent 3,313,306, which in turn is a continuation-in-part of applications Ser. Nos. 351,162, now abandoned, and 458,050, filed Mar. 11, 1964, and May 24, 1965, respectively, application Ser. No. 458,050 having now issued as U.S. Patent No. 3,217,715 and in turn being a continuation-in-part of applications Ser. Nos. 306,343, 343,463, 351,161, and 392,014, filed Sept. 3, 1963, Feb. 10, 1964, Mar. 11, 1964, and Aug. 25, 1964, respectively, all now abandoned but with the present application having the priority thereof with respect to common subject matter.

This invention relates generally to the production of elongated elements, and preferred embodiments hereof are concerned with the provision of elements having as at least a major constituent a substantially continuous filamentary tow of the type which is suitable for use in smoke filters. However, the invention is applicable to different materials, as well as different forms of material as explained below.

The term "continuous filamentary tow," as used in this specification and the appended claims, is intended to define a material such as that which results when filaments extruded from a plurality of spinnerets are brought together and combined to form a continuous body of fibers randomly oriented primarily in a longitudinal direction. In such a tow, the filaments are generally longitudinally aligned in substantially parallel orientation, but include crimped portions which may form short sections running more or less at random in non-parallel diverging and converging directions.

Continuous filamentary tows of plasticized cellulose acetate fibers have been used heretofore in the manufacture of smoke filters for cigarettes, cigars and the like. Generally, the fibers of the tow emerging from the spinneret are bunched together to form a "raw tow" which is collected into a bale for subsequent processing. Such processing usually involves, in addition to unwinding of the "raw tow," spreading apart of the fibers to provide a relatively thin layer of the same, tensioning of the fibers to render the crimp of uniform character, impregnating the fibrous layer with a plasticizer to bind adjacent fibers together, and gathering the "bonded" layer through a suitable funnel or the like to form a treated cylindrical tow which is overwrapped in a suitable paper to produce a stable elongated element. The paper overwrap is usually provided with longitudinally extending, circumferentially, lines of adhesive to secure the same to the peripheral surface of the tow. This overwrapped rod is then generally severed into segments which are cured and layer cut into substantially equal size filter plugs to be secured to a cigarette or the like by a "tipping" overwrap in a well-known manner. The "curing" procedure has ordinarily been commercially effected heretofore by either heating the paper-covered segments in an oven to allow the plasticizer to permanently bond the tow fibers together, or merely by permitting the segments to age for an extended period of time in an unheated condition. In either event, the tow has a tendency to "shrink" away from the paper overwrap during the curing procedure resulting in various defects to be discussed in more detail hereinafter.

Although satisfactory cigarette filters utilizing the processing techniques described above have been produced, various disadvantages are inherent in such prior operations:

(1) Since the filamentary tow is generally not self-sustaining, it is necessary with prior art techniques to overwrap the same with a suitable paper to facilitate further handling and processing of the filter elements. Such a procedure is relatively expensive and produces a product, the pressure-drop and various other characteristics of which cannot be continuously monitored because of the paper overwrap. It is therefore generally necessary to remove samples from the processing line at spaced intervals for such testing. However, with a testing procedure of this type, it can be readily seen that relatively large quantities of unsatisfactory products can be produced while the sample is being tested, and this can result in a substantial loss of time and material before adjustments can be made in the machinery to correct the deficiencies.

(2) The necessity of a paper overwrap to product stability renders the severing process not completely satisfactory since the material being cut is not of a substantially uniform character, but rather includes materials of different characteristics, i.e., paper and tow, whereby nonuniformity in the product results and relatively high wear on the cutter or knife edges.

(3) Since the continuous filamentary tows manufactured according to the prior art overwrap techniques require a paper overwrap to maintain dimensional stability, their subsequent use is limited generally to cigarette filters, the overwrap preventing certain other applications of the product with which the paper interferes.

(4) Since the product is overwrapped with such techniques, an operator cannot examine a rod as it is produced to determine whether or not the plasticizer has been unevenly applied and/or distributed. The rod is covered with paper as cured and those defects known in the trade as "soft sides" and "worm holes" do not become apparent for convenient observation so as to permit immediate correction of the deficiency. Additionally, since the product is not finally cured as produced, but instead, must await separate final curing, some of the defects do not become apparent on the production line, as such, but rather occur during the curing procedure.

(5) Also, since the products must be cured between high speed production thereof and their ultimate use for example in a cigarette, the prior techniques do not readily lend themselves to automatic material handling arrangements such as, for example, pneumatic conveyors delivering the products from the filter production line directly to the cigarette machine.

Suggestions are found in the prior art for the production of substantially stable tow products, including cigarette filters which do not require an overwrap, but these suggestions each have inherent disadvantages. In general, prior art attempts in this direction have either been commercially undesirable from the standpoint of increased processing costs, decreased product utility or reduced functional efficiency and thus, such suggestions have not gained commercial acceptance by the industry.

More specifically, with the prior overwrap techniques as well as with prior stable rod techniques, the filamentary tow is pulled through the various processing devices. This pulling results in an undesirable tension on the individual filaments and can provide the product with further dimensional instability whereby changes in size, shape and functional characteristics can be experienced during the curing operation and even during subsequent handling in use. Moreover, relatively uneven elongation of the fibers in the filamentary tow can be caused by the pulling tension on the same during feeding, particularly since the material is generally quite soft and pliable during processing. Thus, once again, uniform functional properties cannot easily be realized at least at very high speeds with such procedures. Further, the pulling tension on the tow, particularly if the tow is simultaneously heated, reduces the crimp in the individual filaments both from the standpoint of number of crimps per inch and the amplitude of each crimp.

With other prior stable rod techniques, bonding of the filaments has not been completely satisfactory because the setting or curing steps have failed to evenly and uniformly affect the overall cross-section of the elongated element whereby insufficient hardness and undesirable pressure-drop characteristics have been encountered in many instances. In this regard, previous attempts to carry, rather than pull, the filamentary tow through the processing stations have been coupled with unsatisfactory heating and curing techniques, e.g., reliance on heat conducted by the carrying means to the tow therewithin resulting in insufficient and uneven heating throughout the cross-section of the tow, whereby, although certain disadvantages were removed, other undesirable features were introduced.

A further area in which the prior art has proven to be somewhat deficient concerns the production of stable elongated elements, particularly smoke filters for cigarettes or the like, wherein various additive materials such as carbon or the like are incorporated either as an additive or as a discrete section of the product. Frequent attempts have been made to merely disperse such additive materials throughout the tow prior to forming the elongated element, but the procedures utilized in the past have either been unduly expensive, or have resulted in relatively non-uniform intermixtures of the additive with the tow. Moreover, until relatively recent developments exemplified by the aforesaid U.S. Patent No. 3,217,715, such additives could not be utilized as a predominant structural material within the product. In general, cigarette filtration desiring the incorporation of such an additive has been effected by the use of the well-known "dual filter" wherein two separate filter elements of different properties were secured to each other in end-to-end relationship and then to a tobacco section by a "tipping" overwrap. Some use has also been made of discrete or loose carbon particles intermediate a pair of tow filter elements, all of which was secured to the tobacco portion of the cigarette.

It becomes relatively clear from even a brief consideration of such prior art techniques, that the handling of a plurality of individual filter elements, and even more particularly, the handling of loose carbon particles, in the manufacture of a cigarette is complicated and expensive. Thus, although such techniques are in relatively wide commercial use because of the great public demand for filter cigarettes, they have numerous undesirable characteristics from a manufacturing standpoint.

The production of multiple filter results in particular problems with which this invention is concerned. The term "multiple filter" as used herein is intended to encompass a filter means for a smoking device comprising a plurality of individual filter plugs through which the smoke passes on its way to the smoker. Although such multiple filters are commonly utilized in cigarettes, it is to be understood that means of this type are also useful in other smoking devices such as cigars and pipes.

It is well known that filtering of smoke to remove undesirable constituents is a rather complex problem. In many instances an individual filter plug is not capable of removing all such constituents. For example, certain filter means are particularly effective in removing solid phase components of tobacco smoke while other filter means selectively remove gaseous phase components. In the first category will be found conventional cellulose acetate filamentary tow filter plugs and paper filter plugs. For removal of gaseous phase components an additive such as activated carbon or the like which is highly adsorbent is frequently used. Alternately, a bonded-type filter plug of the type shown in aforementioned U.S. Patent No. 3,217,715 may be provided which is active toward both solid and gaseous phase constituents of cigarette smoke. It is common to use a plurality of filter plugs having different characteristics in order to be able to remove all of the undesirable constituents of the cigarette smoke when each filter plug selectively removes only certain components. Additionally, in an instance such as the bonded-type filter plug, it is frequently desirable to utilize an additional plug in a multiple filter arrangement since the public prefers a white plug at the mouthpiece end of the cigarette, whereas the bonded plug may be formed primarily of carbon which is not desirable from an aesthetic viewpoint. Thus, for many reasons, multiple filters have become quite common for use in filter cigarettes and the like.

The individual filter plugs may be attached directly to a tobacco rod by a tipping overwrap. Alternatively, such individual filter plugs are frequently formed into a "multiple length multiple filter" by a common overwrap which is later severed to form the individual multiple filters since this provides elements of larger size which are easier to handle in the processing machinery. In any event, there are numerous difficulties encountered in incorporating a plurality of filter plugs into either a multiple filter cigarette or a multiple length multiple filter rod. One of the major difficulties is caused by the fact that the individual filter plugs vary slightly in circumference due to normal processing tolerances whereby adjacent plugs in a multiple filter may be of somewhat different size. Thus, joining of the individual filter plugs in the formation of a multiple filter of a cigarette or a multiple length multiple filter rod ordinarily results in the production of longitudinal passages in the multiple filter through which the smoke may bypass at least one of the filter plugs without effective filtration thereby. This phenomenon will be described in more detail hereinafter.

Even with the use of a single filter plug, due to the shrinkage mentioned previously, longitudinal bypasses may result again causing a reduction of filtration efficiency.

While the various techniques and disadvantages of the prior art described hereinabove are believed to be representative of the industry practices and products in most wide-spread use at the present time, it is to be understood that the foregoing is not intended to be comprehensive and, by contrasting the instant inventive concepts with presently known production procedures, other undesirable features inherent in the latter will be readily recognized.

Bearing in mind the foregoing, a primary object of the present invention is the provision of stable elongated elements which in themselves are free from the various disadvantages noted above, and which are manufactured utilizing methods and means not subject to the drawbacks of previously utilized techniques and devices.

Moreover, this invention provides for the joining of a plurality of individual filter plugs into a multiple filter wherein the individual filter plugs are maintained together by a common overwrap in a manner which results in a secure assembly wherein the wrapper will not separate from its attachment to any of the individual plugs during handling of the same.

Moreover, this invention contemplates the production in a multiple filter, of a plug of the type described which is relatively resilient whereby it can be uniformly compressed about its periphery without producing any irregularities, i.e., the plug maintains substantial uniformity throughout even when deformed by peripheral compression sufficient to insure non-bypassing of the plug and to reduce its circumference slightly so as to assume a size equivalent to an adjacent filter plug if the plug is used in a multiple filter.

Yet another objective of this invention is the production of a self-sustaining filter plug which may be advantageously utilized in a multiple filter and which has an embossed pattern on its peripheral surface, the pattern being discontinuous to the longitudinal passage of smoke thereover when the plug is integrated into a cigarette or a multiple filter thereby further reducing the possibility of bypassing of smoke without effective filtration of the same.

Still other objects will in part be obvious and in part be pointed out as the description of the invention proceeds and as shown in the accompanying drawings wherein.

Like reference characters refer to like parts throughout the several views of the drawings.

Referring now to the drawings in general, and more particularly to FIGURES 1-10, one means for producing stable elongated elements according to the instant inventive concept is designated generally by the reference numeral 20. Although, as has been mentioned hereinabove, certain of the basic features of this invention are equally applicable to the production of elongated elements such as filter rods or the like, formed predominantly of particulate materials such as shown in parent application Ser. No. 351,162, the drawings illustrate the formation of such products from a continuous filamentary tow.

Further, while any of the filamentary materials commonly used for producing elongated bodies such as filter rods and the like may be processed in accordance with this invention, such materials including the polyolefins, e.g., polyethylene, the polyamides, e.g., nylon, the polyesters, e.g., polyethylene terephthalate and the like, most products of this type are formed from cellulose acetate tows and the instant invention will be generally described with relation thereto. However, it is to be understood that similar products could be produced utilizing other materials in their entirety, or mixtures of such other materials with cellulose acetate. The use of materials other than cellulose acetate would necessitate only slight modifications in the processing techniques which would be obvious to those with ordinary skill in this art.

In the following description, however, it will be assumed that a continuous filamentary tow 22 has been formed from spinneret devices by any of the established techniques widely used in the industry today for formation of "cigarette filter" tows, and that the tow 22 has been stored such as in a bale 24 or the like from which it can be withdrawn as desired for the further processing now to be described. Such a tow is generally referred to as a "raw" or "untreated" tow, and, as is well known, the fibers thereof are normally crimped and unbonded.

Figures 1, 2:
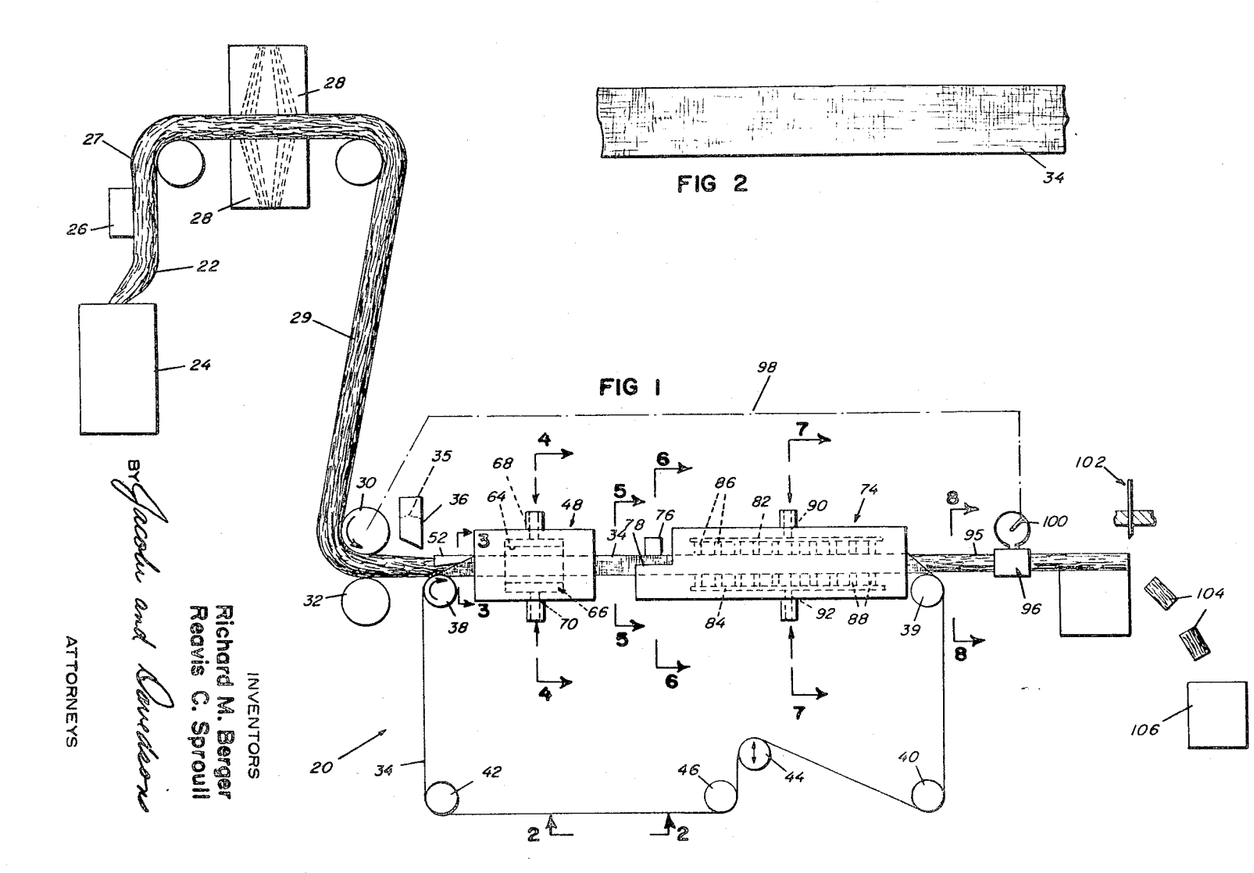
FIGURE 1 is a schematic representation of a preferred method and means for producing stable elongated elements in accordance with the instant invention, certain hidden parts being shown in dotted lines for illustrative clarity.
FIGURE 2 is an enlarged, fragmentary, plan view taken substantially on line 2—2 of FIGURE 1 and showing a portion of the endless, flexible, pervious or porous belt utilized for forming and carrying the tow material through the various processing stations.

Known techniques can be initially followed in carrying out the instant invention, and as shown in FIGURE 1, the raw tow 22 in its crimped form, is passed through a conventional banding device 26 which comprises multiple jets disposed to blow air under pressure against the tow so as to separate the individual fibers thereof. The banded tow 27 may then be passed between pairs of rollers (not shown) to render the crimps therein of uniform character, following which the material passes through another banding device (not shown) similar to the device 26 which may be utilized to spread the tow into a relatively thin filamentary layer.

As shown in FIGURE 1, the filamentary layer is then passed through a plasticizing device 28 wherein a suitable plasticizer such as triacetin, triethyl citrate or the like is sprayed by suitable jets onto one or both sides of the filamentary layer to form a plasticized tow 29. The quantity of plasticizer may vary, although the instant invention requires no more than and frequently less than, prior art techniques.

Any conventional feeding means such as the pair of rollers 30, 32 may be utilized to deliver the plasticized tow 29 to the endless belt 34 to be described in more detail hereinafter. Of course, it is to be understood that at least one of these rollers 30 must be driven to effect the withdrawal of the "raw" tow 22 from the bale 24 and the feeding of the same to the belt 34 for carrying through subsequent processing stations.

The tow speed can be sufficiently great to provide satisfactory commercial production rates. Speeds of up to 200 meters per minute have been utilized with acceptable product characteristics. Of course, the feeding rate must be correlated with the capacity of the various processing stations to insure that resultant elements will have satisfactory properties. Such correlation can be readily accomplished by those with ordinary skill in the art.

If desired for special functional characteristics, an additive 35 may be substantially uniformly dispersed across at least the major portion of the width of the relatively thin layer of palsticized tow 29 by merely feeding the same from a dispensing means such as shown in dotted lines at 36 following the feeding roller 30. Such additives may be in the form of a liquid or in the form of a particulate material and may serve to modify the structural or functional properties of the final product. For example, various sorbent materials may be included to improve the filtration effected by the final product if the same is to be used as a cigarette or industrial filter. Exemplary of such materials are activated carbon, silica gel, alkali metal aluminosilicates, such as molecular sieves sold by Linde Company, a division of Union Carbide Corporation, sucrose, activated alumina, volcanic ash, granular calcium carbonate, granular sodium carbonate, fuller's earth, magnesium silicates, asbestos powder, metallic oxides such as iron oxide and aluminum oxide, metal treated carbon and the like. Additionally, where porosity or strength properties are a major consideration, metal fibers or even fibrous carbon can be included. Moreover, taste modifiers may be incorporated for obvious purposes. Additionally, certain particulate resinous materials such as finely divided polyethylene or polypropylene may be included to improve the binding characteristics as well as the filtration properties of the final product. Mixtures of the above materials are also contemplated. Although it is important to recognize that while the additives and/or fillers listed above can be used if a particular effect is desired, they must be maintained in minor proportion in the overall construction, generally not more than about 30 percent by volume, if a structure having the basic characteristics of a continuous filamentary tow is desired.

The endless, flexible, pervious or porous belt 34 is utilized to define a continuous material-forming and carrying surface and is orbitally trained about a group of path-defining rollers 38, 39, 40 and 42, at least one of which is driven by any conventional means (not shown). Additionally, a pair of tensioning rollers 44, 46 are included in the path of travel of the belt 34, the roller 44 being adjustable to facilitate maintaining a desired tension on the belt.

The preferred embodiments of this invention make use of a woven monofilamentary belt made of nylon or other polymeric material. It is also presently contemplated that the belt may be formed of multifilamentary glass fibers either partially coalesced or twisted to form strands which are then woven to the final shape. In any event, the basic requirement is that the belt be sufficiently porous or permeable that the various gaseous mediums, e.g., steam and air, to be utilized in treating the material therewithin in the processing stations to be described in more detail hereinafter, can pass through the belt without any significant obstruction and actually penetrate the material for optimum and substantially uniform results throughout the entire cross-section of the material. Preferably, of course, the pores in the belt are smaller than any of the material although the housings of the processing stations may assist in supporting the belt to retain the material therewithin.

If desired, the belt may be provided with a lubricating or wear-resisting coating such as polytetrafluorethylene or a silicon emulsion. Such materials improve the water resistant properties of the belt as well as preventing adhesion between the belt fibers and the material carried thereby.

Referring now more particularly to FIGURES 1–3 and 9, the plasticized tow 29, with or without additives, is fed onto the belt 34 by the rollers, 30, 32 in advance of a steam-treating station 48. The belt 34 is initially formed around the tow 29 by an elongated, open arcuate trough 50 (not shown in FIGURE 1 for illustrative clarity) and the tow 29 is guided into the belt 34 by an elongated, concavely curved tongue 52 fitting within the trough 50 and the belt 34. Portions of the steam-treating station 48 define an elongated bore 54 seen particularly in FIGURE 9 which receives the belt 34 and the tow 22 from the trough 50 and the tongue 52. The bore 54 has a circumference so dimensioned with respect to the width of the belt as to form the belt into a substantially closed cross-section as it moves through the bore. The curve of the tongue 52 constantly decreases in cross-section and the smaller end of the tongue extends into the bore 54 as will be seen in FIGURE 9 until the belt 34 is substantially completely closed about the tow 29 to insure that the tow is guided into the closed belt. However, the tongue can terminate at the entrance of the bore, and the belt can there close. This forming of the belt and thereby the tow is accomplished at least partially in the initial portions of the steam-treating station 48 for convenience, but it will be understood that separate means may be included to effect this function, if desired.

Figures 3, 4, 5:
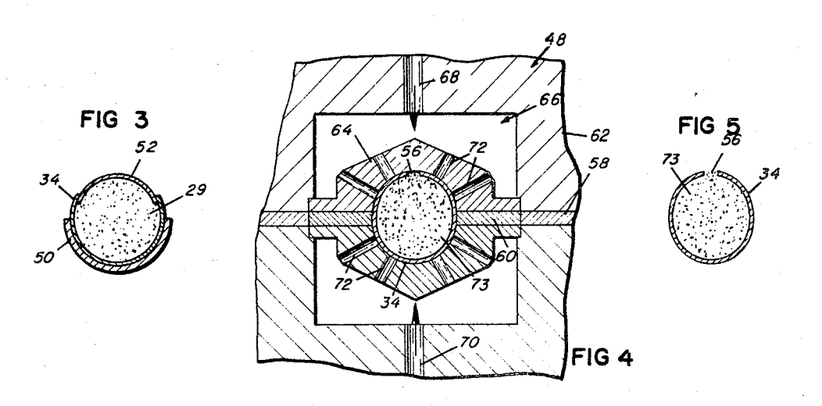
FIGURE 3 is an enlarged, transverse cross-sectional view taken substantially on line 3—3 of FIGURE 1 and showing the initial formation of the belt and the guiding of the continuous filamentary tow thereinto.
FIGURE 4 is an enlarged, fragmentary, transverse cross-sectional view taken substantially on line 4—4 of FIGURE 1 and illustrating the confined zone wherein steam-treatment of the material is effected.
FIGURE 5 is an enlarged, transverse, cross-sectional view taken substantially on line 5—5 of FIGURE 1 and showing a somewhat elongated or elliptical shape which the belt and material therein may take as the same leaves the steam-treating station according to one embodiment of this invention.

Since there is some difficulty in forming the belt around the tow in a manner to provide a perfect meeting of the longitudinal edges of the belt, a longitudinal seam 56 will ordinarily result during this initial forming operation. In order to remove this seam by a pressing operation to be explained in more detail hereinafter and compensate for the change in cross-sectional shape of the tow resulting from the seam-removing operation, the tow may be initially formed into a slightly vertical, elongated or substantially vertical, elliptical shape as shown particularly in FIGURES 4 and 5. It is to be understood that this elongated shape and the seam resulting between the longitudinal edges of the belt are exaggerated in the drawings for illustrative convenience. In this regard, shims 58, 60 are shown in the housing 62 and insert 64 of the steam-treating station 48 as illustrated in FIGURE 4 to emphasize the slightly elongated construction of the confined area within the insert 64 which receives the belt 34 and the tow therewithin as the same passes through the steam-treating station. However, an elliptical bore can be used in insert 64.

In either event, the width of the belt 34 is slightly less than the circumference of the elliptical confined area in the insert 64 whereby the longitudinal edges of the same will be slightly spread apart to facilitate the later seam-removing operation.

It is to be understood that the use of an elliptical bore in the steam-treating station is optional and that, in many instances, this feature is not necessary since the seam-removal step does not deform the rod to any significant degree. In these instances, the bore in the steam-treating station may corresponding to the size and shape of the finished product.

The insert 64 is carried within an elongated chamber 66 which receives steam from a source of the same (not shown) through a pair of oppositely disposed conduits 68, 70. A plurality of radially spaced passageways 72 are defined in the insert 64 communicating between the chamber 66 and the central area in which the belt 34 and tow therein are confined. Thus, steam under pressure is passed continuously and directly through the porous surface of the belt 34 and into the tow as the same is carried by the belt through the steam-treating station, to produce a steam-treated tow 73 which may be generally or elliptical cross-section if an elliptical bore is utilized and which has a longitudinal seam 56.

In this manner the bonding constituents of the tow are activated by the steam while the tow is in a relaxed or substantially tensionless condition since it is being carried by the belt, rather than pulled through the processing station by some forwardly-positioned pulley means. Heating of the tow in a relaxed condition tends to retain or increase the crimp in the individual filaments rather than reduce the frequency and amplitude of the same as would result when the tow is pulled through the processing stations, particularly if the tow were heated under tension. Additionally, the technique of this invention effects a substantially complete curing of the tow during the processing and before any overwrapping of the rod whereby the defects caused by shrinking of the tow in conventional paper-overwrapped filter plugs during the post-wrapping curing or aging is obviated. Thus, even when the product of this invention is subsequently overwrapped either by a tipping paper in the manufacture of filter cigarettes or by a wrapper in the production of a multiple length multiple filter rod, no significant shrinkage will result and the tow will not tend to separate from the overwrapping material. This feature precludes longitudinal passageways through which the smoke may bypass the filter.

The specific construction of the products of this invention has a highly resilient nature compared to prior art filter plugs whereby its surface, in which the filaments are crimped as are the filaments in the remainder of the rod, is deformable, that is, radially compressible without producing any superficial irregularities or adversely affecting the uniformity of the element.

The steam requirements can be varied by those with ordinary skill in the art to produce the desired activation of the bonding constituents of the tow, but, as will be seen from the subsequent examples, it has been found that with a tow feed rate of approximately 117 meters per minute and a tow cross-section of approximately 0.5 cm.$^2$, approximately 24 pounds per hour of steam provides satisfactory results.

Figures 6, 7, 8, 9, 10:
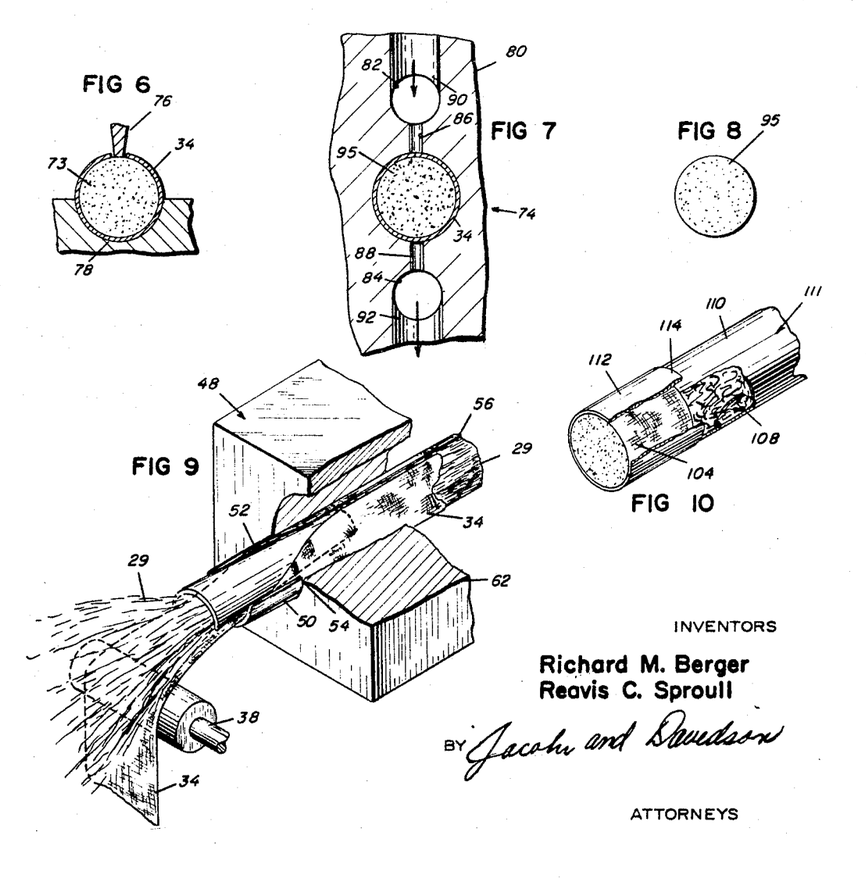
FIGURE 6 is an enlarged, fragmentary, transverse cross-sectional view taken substantially on line 6—6 of FIGURE 1 and illustrating the removal of the seam from the steam-treated intermediate element and the simultaneous reforming of the same into its substantially cylindrical final cross-sectional shape.
FIGURE 7 is an enlarged, fragmentary transverse cross-sectional view taken substantially on line 7—7 of FIGURE 1 and showing the confined zone wherein air cooling of the material is effected.
FIGURE 8 is an enlarged, transverse cross-sectional view taken substantially on line 8—8 of FIGURE 1 and illustrating the final circular cross-sectional shape of the stable elongated product.
FIGURE 9 is a fragmentary, perspective view of the initial forming of the endless belt and the material therein, parts being broken away for illustrative clarity.
FIGURE 10 is an enlarged, fragmentary, perspective view of a cigarette carrying a filter plug made according to the process shown in FIGURE 1, parts being broken away for illustrative clarity.

Referring now particularly to FIGURES 1 and 6, the belt 34 with the steam-treated tow 73 therein moves from the steam-treating station 48 toward the cooling station 74. However, before entering the cooling station 74 a presser foot 76 engages the longitudinal seam 56 between the edges of the belt 34 to remove the same from the tow. The presser foot 76 is disposed in spaced relationship to an arcuate trough 78 formed at the entrance to the cooling station 74 so that, if an elliptical product is formed in the steam-treating station, the pressure resulting from engagement with the foot 76 will simultaneouly reform the tow 73 into a substantially circular cross-section as will be seen in FIGURE 6 which corresponds to the desired cross-section of the final product. It is to be understood, once again, that the elements are somewhat exaggerated for illustrative purposes and that the presser foot 76 need not be, for example, any more than approximately 1/8" in cross-section under ordinary circumstances.

The housing 80 of the cooling station 74 defines a confined area in the form of an elongated cylindrical bore of a circular cross-section substantially corresponding to that of the final product as will be seen in FIGURE 7. The circumference of the confined area in the cooling station 7 is substantially equal to the width of the belt 34 whereby the longitudinal edges of the belt substantially meet during passage through the cooling station. It will be noted that the cooling station 74 is substantially longer than the steam-treating station 48 since it has been found that the production speed of the apparatus is dependent on the cooling capabilities in this station.

In order to provide for the most efficient cooling characteristics the station 74 is provided with a pair of elongated plenum chambers 82, 84 which communicate with the confined area through which the belt 34 and the tow therein passes, by means of a plurality of longitudinally spaced passageways 86, 88. The upper plenum chamber 82 receives air or other inert cooling gas, preferably under pressure, through a conduit 90 from a source (not shown). Similarly, a conduit 92 communicates with the plenum chamber 84 for removal of the air, vacuum being supplied at this point, if desired. In any event, it will be seen that the cooling gas is actually forced through the steam-treated tow 73 as the same is carried by the belt 34 through the cooling station 74. Once again, the cooling, drying and hardening of the tow and the setting of the bonding constituents of the same take place substantially in the absence of any tension.

As in the case of the steam requirements, the cooling gas may be varied within the skill of the ordinary artisan to insure that the desired characteristics in the final product will be obtained. It has been found, however, as will be seen from the subsequent examples, that with a tow feed and cross-section such as described with regard to the steam requirements, approximately 19.5 cubic feet per minute of air at room temperature, e.g. 70 to 85° F., and 26½ p.s.i.g. produces satisfactory results.

At the cooling station, the gas is passed into and through the formed material for essentially two purposes, namely, to cool and set or cure the previously activated bonding constituent and to remove excess moisture from the material. When the steam is passed to and into the tow to activate the bonding constituent, there is a tendency for the same to condense thus giving the product excessive moisture. Moreover, the steam expedites the action of the plasticizer on the tow—i.e., it activates the bonding constituent so as to cause instantaneous bonding of the plasticized material. Thus, while the steam serves to efficiently and uniformly activate the bonding constituent at high speeds, it has been found necessary at the cooling station to not only deactivate the bonding constituent but to also remove the excess moisture. In fact, the steam preferably causes full utilization of the plasticizer and the cooling gas then basically functions to remove excess moisture in the tow resulting from condensation of the steam and rigidify the rod being produced. Therefore, the terminology "set the bonding constituent" as used in the specification and claims is to be understood as including the operation just described when there is no plasticizer remaining in the tow to deactivate after the steam treatment.

With respect to the operations at both the steam treating and cooling stations, it is significant to note that the steam and air respectively pass to and into the tow without experiencing any significant or substantial flow resistance from the belt. The belt is thus sufficiently pervious, by virtue of its open mesh characteristics, to effectively permit vapor and gas passage therethrough without obstruction. This is to be distinguished from a fabric or closely woven belt wherein heat may be conducted therethrough, but obstruction and resistance is encountered in the passage of any gas or vapor therethrough.

The product 95 is peeled from the belt 34 as the same leaves the cooling station 74 and the belt 34 is substantially flattened and continuously orbited over the path-defining and tensioning rollers 39, 40, 44, 46, 42 and 38 to receive additional plasticized tow 29 in advance of the steam-treating station 48. Thus, uninterrupted processing of the tow is effected by forming and carrying the same in the belt 34 with substantially no tension on the tow during the steam and cooling procedures.

The product 95 is in the form of a stable, self-sustaining, elongated element shown illustratively as substantially circular in cross-section although it is to be understood that similar techniques could be utilized for the production of elements of substantially any other desired cross-section. The resultant product 95 has the individual filaments of the tow bonded to each other at spaced points to form a porous mass which, when used as a smoke filter, defines a plurality of tortuous paths for the passage of the smoke whereby effective filtration can be realized. The peripheral surface of the product 95 is textured as a result of an embossing operation produced by the surface configuration of the belt 34. This textured or embossed surface functions to prevent fraying, i.e., to render the filaments resistant to separation at the periphery of the product, as well as providing the periphery with improved bonding properties for adhesively securing the same to a paper overwrap such as the "tipping" overwrap conventionally used in the formation of filter cigarettes or the like. This latter characteristic is in sharp contrast with the relatively smooth peripheral surface resulting from various prior art attempts at producing self-sustaining elongated bodies. Moreover, the open mesh, woven nature of the belt inherently produces an embossed pattern which is discontinuous to the longitudinal passage of smoke therethrough when the element is incorporated into the filter section of a cigarette or the like. It will be readily seen that the particular design of the embossed surface may be varied at will by merely utilizing a belt having the desired surface configuration.

Although a "tipping" overwrap is conventionally utilized to attach a filter element such as the product of the instant invention to a tobacco section of a cigarette or the like, such an arrangement is to be distinguished from the utilization of a paper overwrap for the elongated element itself to provide dimensional stability. Such prior art paper or plastic overwraps are necessary during the processing cycle whereby, as pointed out earlier, pressure-drop characteristics of the product cannot be monitored without removing sample portions from the production line. In contrast, since there is no overwrap utilized in the production of the continuous element according to the instant invention, the product 95 can be passed through a pressure-drop measuring means 96 of conventional design in order to continuously and directly monitor this property of the product without removing samples at selected intervals as has been necessary heretofore. By this technique, any conventional means shown schematically as a mechanical linkage by the dashed lines 98 may be utilized to translate the pressure-drop reading illustratively shown on the gauge 100 into a control for the rate of feed of the tow 29 by, for example, the driven roller 30. In this manner, feeding of the tow 29 may be automatically and continuously varied in response to any changes in pressure-drop of the product 95 whereby substantially constant pressure-drop characteristics may be maintained. In other words, if the pressure-drop of the product is found to be above the optimum value indicating that the product is too dense, the rate of feeding the tow into the steam-treating station 48 can be automatically reduced to compensate therefor. Similarly, if the pressure drop characteristics are below the desired optimum, the tow feed can be increased.

Although the means for effecting this continuous measuring of the pressure-drop properties of the product, and controlling the feed of the tow in response thereto have been shown schematically in the drawings, actual mechanical and electrical devices to effect these operations can be readily designed by those with ordinary skill in the art.

The product 95, after having its pressure-drop properties measured, if desired, can the be severed by any conventional means shown schematically at 102 into individual segments 104 of at least substanially equal predetermined lengths for cellection as in the collecting means 106. Once again, the continuous nature of the process can be retained by causing the severing means 102 to move with the product 95 in a well-known manner. If the product is to be utilized as a smoke filter, the segments 104 are generally cut into lengths equal to any even number of individual filter plugs which may be later subdivided as is conventional in cigarette manufacture. The characteristic all-tow structure of the preferred product of the instant invention facilitates the severing technique in that it is unnecessary for the knife blade to engage materials of different characteristics such as the paper overwrap and tow core generally encountered in prior art products.

The use of a product segment 104 as a cigarette smoke filter is shown in FIGURE 10 wherein a mass of tobacco 108 overwrapped with conventional cigarette paper 110 to form a tobacco section 111 is secured to the filter plug 104 by a conventional "tipping" overwrap 112. Preferably, the "tipping" overwrap 112 is adhesively secured substantially uniformly to the embossed peripheral surface of the filter plug 104 and includes an integral extended portion 114 adhesively secured to the cigarette paper 110 at one end of the tobacco section 111. In this manner a single overwrap for the filter plug functions to attach the same to the tobacco section and simultaneously precludes channelling of smoke around the periphery of the filter plug. Channelling may be even further reduced if the filter plug is initially slightly larger in circumference than the tobacco rod whereby it is uniformly compressed by the application of the tipping paper 112. Due to the unique nature of the product of this invention, its great flexibility permits compression without producing any superficial irregularities and without affecting its substantial uniformity throughout. Further details as to this feature of slightly compressing the plug in use will be set forth hereinafter with respect to the multiple filter embodiments of this invention.

As explained hereinabove, the embossed periphery of the filter plug 104 improves the bonding properties necessary for adhesively securing the same to the tipping overwrap 112 by providing a greatly increased surface area for reception of the adhesive material.

Although the instant inventive concept has been generally described with reference to the production of cigarette filters or the like, it will be seen that the resultant product may have many other uses, both related and unrelated to the smoke filtration of a filter cigarette. For example, the individual segments 104 may be utilized as industrial smoke filters or gas-liquid contact elements whereby the material being processed passes directly through the element as in a cigarette filter or, alternatively, into peripheral contact with a plurality of such elements as in the well-known "stacked columns." Further, the capillary properties of the product of the instant invention may be utilized, for example, in the use of the product elements as ink absorbers within dispensing containers such as the common "felt" marking devices. Other similar applications for such products will be obvious to those with ordinary skill in the art and it is intended that the reference throughout this specification to smoke filters be considered merely as illustrative of the preferred use, rather than as limiting on the instant inventive concept.

Figures 11, 12, 13, 14, 15, 16:
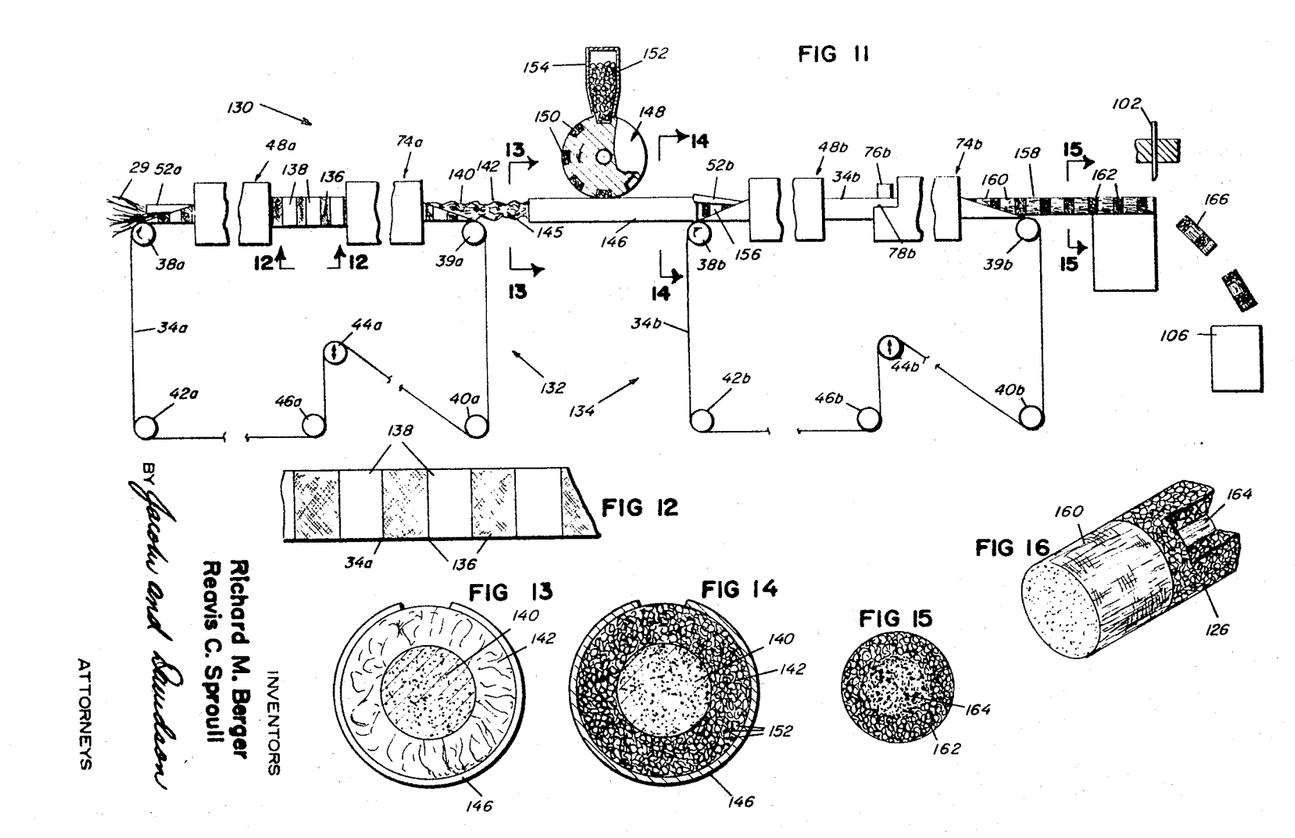
FIGURE 11 is a schematic representation of a preferred method and means for forming integral "dual filter" elements according to the instant inventive concept, parts being broken away for illustrative clarity and convenience.
FIGURE 12 is an enlarged, fragmentary, elevational view taken substantially on line 12—12 of FIGURE 11 and illustrating a portion of the endless, flexible, partially previous porous belt utilized in the initial formation of an integral "dual filter" according to this invention.
FIGURE 13 is an enlarged, transverse cross-sectional view taken substantially on line 13—13 of FIGURE 11 and showing the intermediate elongated element as the same is being confined for subsequent inclusion of an additive material.
FIGURE 14 is an enlarged, transverse cross-sectional view taken substantially on line 14—14 of FIGURE 11 and illustrative of the intermediate product with the additive material carried thereby.
FIGURE 15 is an enlarged, transverse cross-sectional view taken substantially on line 15—15 of FIGURE 11 and showing the structural characteristics of the additive-containing portion of the integral "dual filter" product.
FIGURE 16 is an enlarged perspective view of an integral "dual filter" formed in accordance with the method of FIGURE 11, parts being broken away for illustrative clarity.

Reference is now made particularly to FIGURES 11–

16 wherein a modified means according to the instant invention is designated generally by the reference numeral 130. This embodiment is directed to the production of stable elongated products having longitudinally spaced portions of different characteristics integrally connected by a central core formed from a continuous filamentary tow and utilizes, in effect, a double pass of the tow through two apparatus sections, each similar to the embodiment of FIGURE 1. In order to simplify an understanding of this modification, elements similar to those of FIGURE 1 forming the initial pass 132 have been designated in FIGURE 11 with the same reference numerals as in FIGURE 1 followed by the suffix *a* and elements similar to those of FIGURE 1 forming the second pass 134 have been designated in FIGURE 11 with the same reference numerals as in FIGURE 1 followed by the suffix *b*.

The tow 29 which may have been banded, plasticized and treated with additive, if desired, as in FIGURE 1, is fed onto the first belt 34a in generally the same manner as the tow 29 was fed onto the belt 34 in the embodiment of FIGURE 1. However, the belt 34a, as will be seen particularly in FIGURE 12, has alternate pervious or porous and impervious or non-porous sections 136, 138. Thus, on passage of the belt 34a through the first steam-treating station 48a after forming the belt about the tow 29, steam will pass only through the porous sections 136 of the belt and into contact with spaced portions of the tow 29 to decrease the diameter of the same as shown at 140 and to activate the bonding constituent in these spaced portions. Intermediate portions 142 of the tow 29 will not be contacted by the steam in the station 48a since these portions correspond to the non-porous sections 138 of the belt 34a.

Similarly, during passage of the belt 34a and the material confined therein through the first cooling station 74a, cooling gas is passed through the porous sections 136 of the belt 34a and into contact with the portions 140 of relatively smaller cross-section of the tow to set the bonding constituent of the same and thereby form a continuous intermediate element 145 having alternate portions of relatively large and relatively smaller cross-sections corresponding to the porous and non-porous sections of the belt.

The confined areas within the first steam-treating station 48a and the first cooling station 74a are somewhat larger than the cross-section of the final product and the production of the intermediate element 145 need not be concerned with removal of the longitudinal seam or reforming of the same to a substantially circular cross-section since such operations will be effected during the second pass 134.

The intermediate element 145, after separation from the first belt 34a, is at least substantially confined by passing the same through an arcuately bent, elongated trough 146 to define spaced annular areas surrounding the portions 140 of relatively smaller cross-section. The upper edges of the trough-defining element 146 are slightly spaced apart as shown, for example, in FIGURES 14 and 15, whereby the annular areas may be filled with at least one additive material including a bonding constituent which will be activated during the second pass 134. Various methods and means may be utilized for forming and filling the annular areas, one technique being illustrated by the wheel 148 having peripheral pockets 150 for reception of the additive material 152 from a hopper 154 or the like. The pockets 150 are spaced in relation to the distance between the annular areas on the intermediate element 145 and the rate of rotation of the wheel 148 is correlated in any conventional manner with the rate of feed of the intermediate element 145 through the trough 146 whereby predetermined quantities of additive material 152 automatically fill the annular areas in the intermediate element 145 as will be seen particularly in FIGURE 14. A shroud (not shown) or other such device can be utilized to maintain the additive within the pockets 150 between the point at which they are filled from the hopper 154 and the point at which they are emptied into the annular areas in the intermediate element 145 within the trough 146.

It is to be understood that any desired additive material or combination of additive materials may be utilized to fill the annular areas in the intermediate area 145 so long as such additive materials include a bonding constituent which will be activated during the second pass 134. The preferred material, particularly for use in the production of cigarette filters or the like, is the combination of particles of activated carbon and particles of a thermoplastic material such as polyethylene utilized in the production of stable elongated bodies in the various parent applications referred to hereinabove. The polyethylene, being thermoplastic, will automatically be activated by contact with steam during subsequent processing of the additive-containing intermediate element 156.

This element 156 is fed directly from the trough 146 onto the second belt 34b which is completely porous as is the belt 34 in the embodiment of FIGURE 1. In fact, the elements and processing techniques utilized in the second pass 134 of the embodiment of FIGURE 11 correspond substantially to the method and means shown and described with reference to FIGURE 1. Thus, the additive-containing intermediate element 156, wrapped in the belt 34b is passed through the second steam-treating station 48b, which may or may not have its confined area of substationally elliptical cross-section, but in any event having a confined area relatively smaller than the confined area of the first steam-treating station 48a. Steam passing through the entirely porous belt 34b in this station activates the bonding constituents both of the tow and of the additive material.

The longitudinal seam formed in the steam-treating station 48b is removed by the presser foot 76b acting in conjunction with the trough 78b and the additive-containing intermediate element 156 is reformed into the substantially circular configuration of the confined zone of the cooling station 74b and the final product 158. Cooling gas passing through the second belt 34b in the cooling station 74b sets the bonding constituents of the tow and the additive material and bonds the same into the final product 158 which is in the form of a stable, continuous element having alternate all-tow portions 160 spaced apart by portions having an annular section 162 of the additive material bonded together and to a tow core 164 which is integral with adjacent all-tow portions 160.

The elongated product 158 may be severed as in the embodiment of FIGURE 1 to form a plurality of individual segments each including at least one all-tow portion 160 and at least one portion having an annular section 162 of additive material bonded to a tow core 164 integral with the all-tow portion 160.

The elongated product 158 may be severed as in the embodiment of FIGURE 1 to form a plurality of individual segments each including at least one all-tow portion 160 and at least one portion having an annular section 162 of additive material bonded to a tow core 164 integral with the all-tow portion 160.

As shown in FIGURE 11, the segments 166 may contain a plurality of all-tow and additive-containing portions which are later subdivided to form individual, integral "dual filters" such as shown in FIGURE 16 for use with a cigarette or the like in a conventional manner.

In order to further facilitate an understanding of the instant invention, the following examples are set forth although it is to be understood that these examples are intended merely as illustrative of preferred processing conditions, and not as limiting.

*Example 1*

The procedure shown in FIGURE 1 was followed utilizing a tow speed of approximately 117 meters per minute of a "raw" cellulose acetate. After banding, approximately 10 percent by weight of the tow of triacetin was sprayed onto the relatively thin layer of filaments and the plasticized tow was formed into a generally elliptical shape of a cross-section of approximately 0.5 cm.² Steam at a rate of approximately 24 pounds per hour was passed into the plasticized tow in the steam-treating station following which the longitudinal seam formed in the tow was removed by pressing. The tow was cooled by approximately 19.5 cubic feet per minute of air at 75° F. and 26.5 p.s.i.g.

Individual filter rods of approximate lengths of 80 mm. were severed from the continuous product and such rods, as produced, and after 24 and 72 hours of storage were found to have the following weight characteristics and constituents:

TABLE I

| Control | Weight (gram/10 rods) | Acetate,* Percent | Plasticizer, Percent | Water, Percent | Total, Percent |
|---|---|---|---|---|---|
| As produced | 5.95 | 82.3 | 10.0 | 7.7 | 100.0 |
| After 24 hours | 5.85 | 83.8 | 10.2 | 6.0 | 100.0 |
| After 72 hours | 5.77 | 84.6 | 10.0 | 5.4 | 100.0 |

*Including lubricant.

The above data shows a reduction in water content during storage but the final moisture can be varied by modifying the characteristics of the cooling station as well as the relative humidity of the storage area.

Comparative test results between the product of the instant invention and ordinary paper overwrapped cellulose acetate rods of the prior art are as follows:

TABLE II

| Control | Paper overwrapped rods | | | Non-wrapped rods | | |
|---|---|---|---|---|---|---|
| | Avg. | Max. | Min. | Avg. | Max. | Min. |
| Weight, gr./10 rods | 6.5 | 6.7 | 6.4 | 5.85 | 5.95 | 5.75 |
| Pressure-drop, inches H²O | 5.3 | 6.1 | 4.2 | 4.8 | 5.1 | 4.4 |
| Circumference, mm | 24.6 | 24.7 | 24.5 | 24.55 | 24.65 | 24.45 |
| Length, mm | 79.7 | 80.4 | 79.3 | 79.7 | 79.8 | 79.5 |
| Hardness | 234 | 259 | 223 | 226 | 223 | 217 |

It will be seen from the above that, in substantially all instances, the non-wrapped rods of the instant invention are more consistent in their properties than the paper overwrapped rods of the prior art. Other functional characteristics of the non-wrapped rods are at least comparable, and in many instances, improved, over prior art constructions.

*Example 2*

Example 1 is repeated with the dispersion of up to 30 percent by volume of finely divided flake carbon particles utilizing the technique shown at 36 in FIGURE 1. Filtration efficiency of the final product is improved because of the higher sorptive characteristics of the additive.

*Example 3*

Utilizing the procedure of FIGURE 11 "dual filters" are manufactured with a plasticized cellulose acetate tow as in Example 1 having a sheath of activated carbon particles bonded together and to a central tow core which is integral with an all-tow portion such as shown in FIGURE 16. Activated carbon particles passing a 20 mesh screen and retained on a 50 mesh screen and polyethylene particles of approximately 50 microns and having a melt index above 5.0 were utilized in a mixture containing approximately 75 percent carbon and 25 percent polyethylene. Treatment of the additive-containing intermediate element in the second pass of the apparatus under similar conditions to those of Example 1, produced a self-sustaining, elongated, cylindrical element which, when severed into "dual filters", provided a bonded carbon section through which the smoke initially passed and an integral all-tow section for additional filtration and aesthetic appeal to the smoking public.

Figure 17:
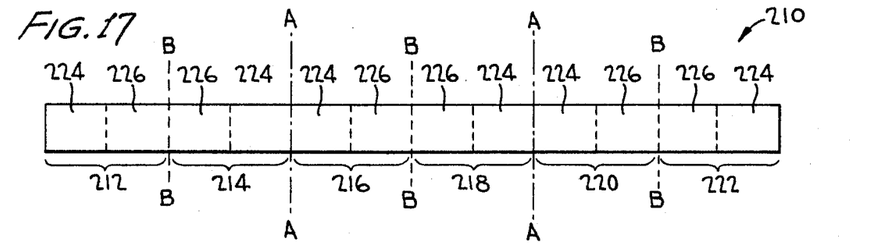
FIGURE 17 is a schematic view of a multiple length multiple filter rod formed from a plurality of individual filter plugs according to conventional practice.
Figure 18:
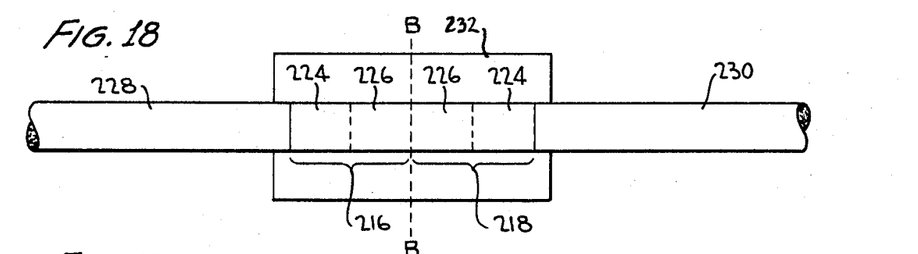
FIGURE 18 is a schematic view showing the production of two filter cigarettes incorporating multiple filters from the rod of FIGURE 17.

With reference now to FIGURES 17–22, and more particularly FIGURES 17 and 18, the construction and use of a "non-integral" multiple length multiple filter rod utilizing a plug formed according to the process of FIGURE 1 will now be described in detail. Such a rod is designated generally by the reference numeral 210 in FIGURE 17 and comprises a plurality of multiple filters 212, 214, 216, 218, 220 and 222 secured together in related assembly by a single wrapper. Each of the multiple filters 212–222 includes at least two sections 224, 226 which may each comprise one or more individual filter plugs.

The rod 210 is initially severed along the dash-dot lines A—A to form a plurality of double length multiple filters since conventional processing machinery joins such a double length multiple filter to a pair of tobacco rods 228, 230 by a tipping overwrap 232 as shown in FIGURE 18 following which the assembly is severed along the dotted line B—B to form two multiple filter cigarettes. In view of this common processing technique the filter sections 226, 224 in multiple filters 214, 218 and 222 are reversed in the rod 210 with respect to the filter sections 224, 226 in the alternate multiple filters 212, 216 and 220. This provides an outer filter section 226 at the mouthpiece and of each multiple filter cigarette and an inner filter section 224 disposed between the outer filter section 226 and the tobacco portion 228, 230.

It is to be understood that, except for the two end filter sections 224 in the rod 210, the intermediate filter sections 224 and 226 may initially be of double length since they will eventually be severed either along the lines A—A or B—B during production. In the event each filter section 224, 226 consists of a single filter plug, the resultant cigarette will be of the well-known "dual filter" type. However, since each of the filter sections 224, 226 or, for that matter, both of the filter sections may comprise a plurality of individual filter plugs, the resultant cigarette may incorporate a "triple filter," "quadruple filter" or the like.

The wrapper of the rod 210 is conventionally adhesively secured to itself in a longitudinally extending, overwrapping seam with longitudinally extending lines of adhesive securing the wrapper to the rod itself. The tipping overwrap 232 is conventionally adhered to the entire periphery of the underlying elements and to itself in a longitudinally extending, overlapping seam. However, in some instances, both the wrapper on the rod 210 and the tipping overwrap 232 may be adhesively secured to the underlying elements over their entire contacting surfaces.

Figures 19, 20:
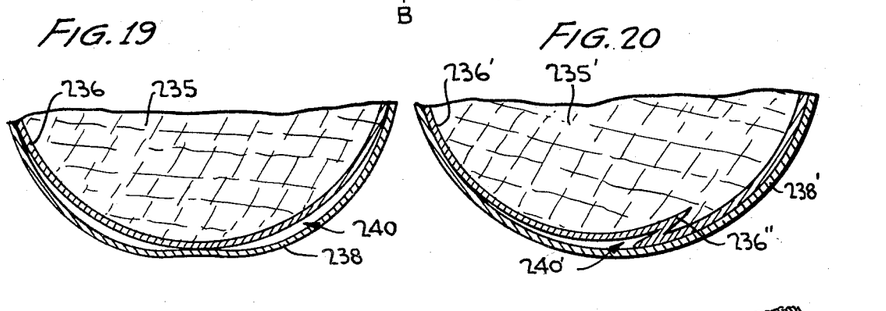
FIGURE 19 is an enlarged fragmentary transverse cross-sectional view through a portion of a prior art multiple filter showing one defect common to such constructions.
FIGURE 20 is an enlarged fragmentary transverse cross-sectional view through a portion of a prior art multiple filter showing another common defect with such constructions.

Before referring to FIGURES 19 and 20 for a discussion of common defects in proir art multiple filter constructions, it should be understood that most conventionally available filter plugs are overwrapped with paper during their manufacture in order to render them self-sustaining. While the term "paper" is used in this specification and the appended claims, this term is intended to encompass any overwrapping sheet whether the same ʰ paper, plastic or other similar material.

The conventional cellulose acetate tow-type filter plug requires a paper overwrap during its manufacture in order that it can be handled in subsequent processing equipment. Similarly, paper filters of the type commonly in use are overwrapped during manufacture to facilitate subsequent handling since they are not self-sustaining in the absence of such an expedient. While the prior art does suggest certain techniques for the production of self-sustaining filamentary tow filter plugs, these elements generally require a thickened peripheral sheath to provide the stability necessary for subsequent handling operations. Such a thickened sheath, in addition to making the filter plug relatively non-compressible, fails to provide an element having substantially uniform porosity over its entire transverse cross-section. This obviously has the disadvantage of reducing the available filtering area or of providing for non-uniform filtration across the plug. With the exception of a filter element produced according to the techniques discussed hereinabove, the industry has been unable to produce a filamentary tow-type filter plug which is both self-sustaining and of substantially uniform porosity and other physical characteristics. Thus, prior art self-sustaining filter elements are not generally utilized commercially and substantially all filter plugs presently in use include an overwrap to provide the necessary stability for the handling encountered during ordinary use of such elements.

Reference will now be made to FIGURES 19 and 20 which disclose two defects commonly found in the manufacture of multiple filters according to techniques presently in use. In FIGURE 19 a portion of a conventional filter plug is shown at 235 as overwrapped with paper 236 and further encased in a wrapper 238 which may either be a tipping overwrap if the multiple filter is secured directly to a tobacco portion of a filter cigarette, or may be the overwrap for a multiple length multiple filter rod such as the item 210 shown in FIGURE 17. In the event the filter plug 235 in the multiple filter is small one or more "crescents" 240 are formed at some point between the outer surface of the paper overwrap 236 and the wrapper 238, generally between the lines of adhesive securing the wrapper to the plug periphery. Defects of this type are quite a problem to the industry and frequently require rejection of products containing the same. Even when the defects are insufficient to cause rejection, they are sufficiently great to mar the appearance of the end of a filter cigarette incorporating the same and to permit bypassing of smoke between the overwrap 236 and the wrapper 238. In the event that the filter plug 235 is the inner filter in a multipler filter cigarete, bypassing of the smoke can still result without effective filtration by this portion of the filter means.

In FIGURE 20 the conventional filter 235' overwrapped with paper 236' is confined within a wrapper 238' of a multiple filter, but in this instance the plug 235' is large whereby the paper overwrap 236' is folded over as shown at 236'' forming a "loop" producing a gap 240' between the paper overwrap 236' and the wrapper 238'. Once again, the appearance of the end of the cigarette is marred by this loop and a passageway is provided for bypassing of the smoke past the plug 235'.

Thus, regardless of whether the resultant defect be of the type shown in FIGURE 19 or FIGURE 20, the aesthetic appearance of the cigarette and the efficiency of the filter means are deleteriously affected. It is obvious that with ordinary processing techniques there are unavoidable variations in circumference of the individual filter plugs. Generally, with conventional cigarettes having a circumference of 25 mm. the operating tolerance on each of the filter plugs is ±0.2 mm. whereby it is possible to have adjacent plugs which differ by 0.4 mm. in circumference. In such instances the defects shown in FIGURES 19 and 20 are produced to a particularly marked degree.

When the individual filter plugs are joined by the wrapper they are simultaneously compressed by a forming member according to conventional techniques. In addition to the problems set forth hereinabove, proper compression is frequently difficult because successive filter plugs may differ in hardness or resilience whereby the forming member cannot produce the same effect on such elements since they may compress and recover in different amounts. Also, the portion of the conventional apparatus utilized to fold the paper overwrap around the filter plugs includes a relatively sharp pointed section or "beak" which may dig into the filter plugs if they are too large or too hard causing further problems in the manufacturing technique.

The combined effects of varying hardness and circumference makes any machine setting a compromise whereby it is almost impossible to have good control over the short term circumference variation. The general practice is to make the filter plug which is to be adjacent the smoker's mouth in the multiple filter cigarette larger than the filter plug which is to be adjacent the tobacco portion. This eliminates the crescent shown in FIGURE 19, but of course, the loop shown in FIGURE 20 has to be tolerated. Yet another difficulty arising from the presence of such defects in prior art constructions is that it becomes necessary, regardless of the manner in which the multiple filter is formed, to destroy a significant proportion of finished products in order to check for the presence of loops or crescents and to insure that the machine setting is as close to acceptable as is commercially possible with such techniques.

By utilizing the method and means set forth hereinabove, particularly with reference to FIGURES 1–10, tow-type filter plugs can be produced which are both self-sustaining and substantially uniform in porosity and physical characteristics throughout any transverse cross-sectional area of the same. Such plugs have the unique ability to be radially compressed without producing irregularities or affecting the overall uniformity of the element. This property is primarily due to the improved flexibility in the plug resulting from its processing in a relaxed condition whereby the crimped nature of the filaments is retained, and even increased. The fact that the surface filaments are crimped as are the interior filaments contrasts greatly with many prior art products in which the peripheral surface has been treated so as to "iron" out the crimps and in some instances even coalesce the same. With such techniques the great resilience realized with the products of this invention cannot be attained whereby uniform compression is impossible.

Preferred techniques of this instant invention take advantage of these characteristics by utilizing a slightly oversized plug and uniformly compressing the same during the joining operation to insure uniform contact with the wrapper material and to preclude bypassing. This concept can be utilized with a single plug in the production of a single filter cigarette such as shown in FIGURE 10. In such a construction, the plug 104 is initially slightly larger in circumference than the tobacco rod. When the tipping paper 112 is applied the plug 104 is compressed to approximately the size of the tobacco rod. Since a plug formed according to the techniques of this invention is resilient enough to be so-compressed without affecting its substantial uniformity and without producing any irregularities, the ultimate product has maximum filtration characteristics in the absence of any significant pressure-drop variations or channeling of the smoke.

Additionally, it is to be understood that a plurality of plugs made according to this invention can be utilized in a single filter section, with each plug having different characteristics. For example, one of the plugs can have an additive such as described with reference to element 35 in FIGURE 1. Alternately, the individual plugs may be formed of tow having different denier or other characteristics. With such arrangements any one of the plugs may be initially formed slightly larger than the remainder of the plugs and compressed during the joining operation. Further, all of the plugs can be slightly oversized with respect to the tobacco rod whereby the entire filter section will be compressed as in the production of a single filter cigarette described hereinabove. This arrangement is most advantageous since smoke bypassing is absolutely precluded.

Although this technique provides certain advantages in the production of single filter cigarettes or a filter cigarette having a plurality of self-sustaining plugs made according to the procedure of FIGURE 1, it is of particular importance in the production of multiple filter cigarettes or multiple length multiple filter rods formed with filter plugs made by conventional processing techniques which ordinarily suffer from defects of the type shown in FIGURES 19 and 20. The multiple filters according to this invention are formed by joining a conventional paper-overwrapped or incompressible filter plug with a self-sustaining, non-wrapped plug of the type just described, with the non-wrapped plug initially having a circumference slightly larger than the paper-overwrapped plug before the plugs are assembled into the multiple filter and with the non-wrapped plug being compressed during the manufacture of the multiple filter to attain a circumference equivalent to the circumference of the paper-overwrapped plug. Since the non-wrapped plug can be so-compressed without significantly adversely affecting its filtration characteristics, and since there is no overwrapping on such a plug, neither the crescent of FIGURE 19 nor the loop of FIGURE 20 need be tolerated in the finished multiple filter. Moreover, the relatively great flexibility and resiliency of such a plug precludes difficulties previously associated with compression of filter elements by the forming member in an ordinary multiple filter manufacturing operation.

Figures 21, 22:
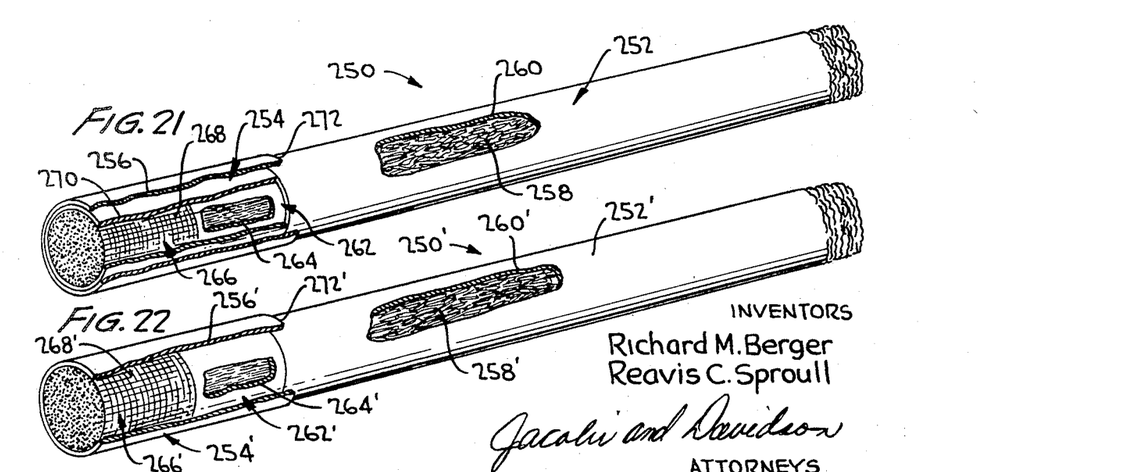
FIGURE 21 is a perspective view of a filter cigarette incorporating a "non-integral" multiple filter according to this invention which was first prepared as a portion of multiple length multiple filter rod and subsequently severed therefrom and secured to a tobacco rod by a tipping overwrap, portions being broken away for illustrative clarity.
FIGURE 22 is a perspective view of a filter cigarette incorporating a non-integral multiple filter according to this invention wherein the individual filter plugs are secured directly to the tobacco portion by a tipping overwrap without first forming a multiple length multiple filter rod, parts being broken away in this figure also for illustrative clarity.

Reference will now be made to FIGURES 21 and 22 for a showing of a cigarette incorporating a multiple filter according ot this invention. The multiple filter cigarette is designated generally by the reference numeral 250 in FIGURE 21 and comprises basically a tobacco portion 252 and a filter portion 254 joined together by a tipping overwrap 256. The tobacco portion 252 is conventional and includes a rod of tobacco 258 overwrapped with cigarette paper 260.

The filter portion 254 of the embodiment of FIGURE 21 comprises a dual filter formed from a multiple length dual filter of the type described with reference to FIGURES 17 and 18. This dual filter includes an inner filter section 262 which is paper-overwrapped as shown at 264, and an outer filter section 266 of the type produced according to the aforementioned parent application and having an embossed pattern on its peripheral surface as shown schematically at 268. The inner filter 262 may be of any conventional form, whether it be a filamentary tow-type filter plug, a paper-type filter plug, or a bonded-type filter plug. In fact, the instant inventive concept is equally applicable to a non-wrapped inner filter plug which is self-sustaining such as a bonded particulate filter of the type shown in the aforementioned U.S. Patent No. 3,217,715 or a self-sustaining filamentary tow filter plug having a thickened peripheral sheath, both of which, like a paper-overwrapped filter plug, are incapable of significant compression without adversely affecting their functional characteristics.

The two sections 262, 266 of the dual filter shown in FIGURE 21 are joined by the wrapper 270 which is utilized in the manufacture of a multiple length multiple filter rod of the type shown in FIGURE 17 and which is preferably secured as by any conventional adhesive to the entire outer surface of the paper overwrap 264 of the filter plug 262 and similarly secured directly to the embossed peripheral surface 268 of the filter plug 266. The circumference of the non-wrapped filter plug 266 is initially slightly larger than the circumference of the paper-overwrapped or other incompressible filter plug 262, but is compressed during formation of the multiple length multiple filter to attain a circumference substantially equivalent to the circumference of the paper-overwrapped filter plug 262.

The tipping overwrap 270 is preferably adhesively secured to the outer surface of the wrapper 270 and includes an integral extension 272 secured to the outer surface of one end of the paper overwrap 260 of the tobacco portion 252 in a conventional manner.

In the embodiment of FIGURE 22 a multiple filter cigarette is shown which is substantially identical to the multiple filter cigarette 250 shown in FIGURE 21 with the exception that the individual filter plugs are secured directly to the tobacco portion of the cigarette by the tipping paper and in the absence of a separate wrapper such as would be utilized in the formation of a multiple length multiple filter of the type discussed with reference to FIGURE 17. Component parts of the FIGURE 22 embodiment similar to parts in the embodiment of FIGURE 21 have been designated by the same reference numeral followed by a prime (') in order to facilitate relating these two embodiments.

It will be seen that, while the wrapper 270 integrates the separate filter sections 262, 266 in the embodiment of FIGURE 21, the tipping paper 256' integrates the separate filter sections 262', 266' in the embodiment of FIGURE 22. In either event, the embossed pattern 268 or 268' on the non-wrapped filter plug is discontinuous to the longitudinal passage of smoke to further preclude by-passing between the periphery of this filter plug and the integrating wrapper. Such a phenomenon is not likely, even in the absence of this particular feature, due to the fact that, in all instances, the non-wrapped filter plug is substantially uniformly compressed about its entire periphery by the overwrap to reduce its circumference as described hereinabove. Due to the resiliency of the non-wrapper filter plug, it is relatively easy to provide the same with a circumference substantially equivalent to the circumference of the paper-overwrapped filter plug whereby the formation of crescents is avoided. Further, since there is no need to compress the paper-overwrapped plug when the instant inventive concepts are utilized, the formation of loops is also precluded.

Although the instant invention is not limited to the production of multiple filters or cigarettes incorporating the same of any particular dimensions, it is believed that it would be helpful if an example is given of the relationship between the elements in the production of a multiple filter cigarette of a size presently commercially available. In general, the multiple filters have a circumference of about 25 mm., a diameter of about 7.9 mm. and a length which can vary from a minimum of about 5 mm. to more generally either 7.5, 10, 17 or 20 mm. Of course, the length can vary depending upon the type and size of filter means being utilized with the cigarette. With the production of a conventional multiple filter means having dimensions on the order of the aforementioned, it has been found that the non-wrapped filter plug should have a circumference at least approximately 0.1 mm. larger than the paper-overwrapped filter plug with which it is to be integrated. The non-wrapped filter plug can be as much as approximately 0.6 mm. larger than the plug with which it is to be associated, but in general, it is desirable to maintain the difference between the circumferences as little as possible to minimize the necessary compresison. However, it is to be emphasized that, since it is impossible to insure exact equivalents between the circumferences of the individual filter plugs, the non-wrapped filter plug is provided with a slightly larger circumference so that it will be compressed during the formation of the multiple filter to insure the desirable construction of the final product set forth hereinabove.

Thus, it will now be seen that there is herein provided elongated elements and smoking means incorporating the same which satisfy all of the objectives of the instant invention, and others, including many advantages of great practical utility and commercial importance.

What is claimed is:

1. The method of associating a filter section with a wrapped tobacco section comprising the steps of locating a filter section including at least one non-wrapped, self-supporting filter unit in juxtaposition with said wrapped tobacco section and axially aligned therewith, said filter unit being resilient and of a circumference larger than the circumference of said wrapped tobacco section, locating a wrapper so that one end of said wrapper is aligned with one end of the filter section and the other end of said wrapper extends a substantial distance beyond the junction at which said filter section and said wrapped tobacco section are in juxtaposition, wrapping said wrapper about said filter section and the end of said wrapper tobacco section juxtaposed to said filter section so that said resilient filter unit is compressed to a circumference equivalent to that of said wrapped tobacco section, and sealing said wrapper.

2. The method of claim 1 wherein said non-wrapped filter unit consists essentially of a tow of generally longitudinally extending filamentary material bonded together throughout to form a resilient, self-sustaining, porous mass.

3. The method of forming a multiple filter comprising the steps of locating at least one non-wrapped, self-sustaining filter unit in juxtaposition with at least one additional self-sustaining filter unit and axially aligned therewith, said first-mentioned filter unit being resilient and of a circumference larger than the circumference of said second-mentioned filter unit, locating a wrapper so that at least one end of said wrapper is aligned with one end of one of said filter units and the remainder of said wrapper at least extends to the other end of the other filter unit, wrapping said wrapper about said filter units so that said first-mentioned filter unit is compressed to a circumference equivalent to that of said second-mentioned filter unit, and sealing said wrapper.

4. The method of claim 3 wherein said first-mentioned filter unit consists essentially of a tow of generally longitudinally extending filamentary material bonded together throughout to form a resilient, self-sustaining, porous mass.

5. The method of claim 3 wherein said second-mentioned filter unit is a paper-overwrapped filter unit and said wrapper is wrapped over said paper overwrap.

6. The method of claim 3 wherein a single paper-overwrapped filter unit is associated with a single non-wrapped filter unit by said wrapper.

7. The method of claim 3 wherein a plurality of said first-mentioned filter units are associated with a plurality of said second-mentioned filter units by said wrapper.

8. The method of claim 3 further including the steps of locating a wrapped tobacco section in juxtaposition with a multiple filter formed according to claim 3 and axially aligned therewith, and joining said wrapped tobacco section to said multiple filter.

9. The method of claim 3 further including the step of locating a wrapped tobacco section in juxtaposition with one of said filter units and axially aligned therewith, locating said wrapper so that one end of said wrapper is aligned with one end of one of said filter units and the other end of said wrapper extends a substantial distance beyond the junction at which said filter units and said wrapped tobacco section are juxtaposed, said wrapper being wrapped about all of said filter units and the end of said wrapped tobacco section juxtaposed to said filter units.

References Cited

UNITED STATES PATENTS

| | | | |
|---|---|---|---|
| 2,998,820 | 9/1961 | Ades | 131—10.7 |
| 3,259,029 | 7/1966 | Hall et al. | 131—94 X |
| 3,176,694 | 4/1965 | Kaeding | 131—94 |

FOREIGN PATENTS 953,775   12/1956   Germany.

MELVIN D. REIN, *Primary Examiner.*